(12) United States Patent
Sack

(10) Patent No.: US 6,917,435 B2
(45) Date of Patent: *Jul. 12, 2005

(54) METHOD, DEVICE AND COMPUTER PROGRAM ELEMENT FOR TRANSMITTING PRINT DATA

(75) Inventor: Christian Sack, Erding (DE)

(73) Assignee: Océ Printing Systems GmbH, Poing (DE)

( * ) Notice: Subject to any disclaimer, the term of this patent is extended or adjusted under 35 U.S.C. 154(b) by 886 days.

This patent is subject to a terminal disclaimer.

(21) Appl. No.: 09/923,819

(22) Filed: Aug. 6, 2001

(65) Prior Publication Data
US 2002/0122200 A1 Sep. 5, 2002

(30) Foreign Application Priority Data

Aug. 25, 2000 (DE) .......................... 100 41 870

(51) Int. Cl.[7] .............................. G06H 15/00
(52) U.S. Cl. ............... 358/1.13; 358/1.15; 358/1.14
(58) Field of Search ................ 358/1.1, 1.13, 358/1.14, 1.15, 1.16, 405; 713/166; 709/217, 219, 203

(56) References Cited

U.S. PATENT DOCUMENTS

| | | | |
|---|---|---|---|
| 5,671,445 A | | 9/1997 | Gluyas et al. |
| 2003/0163544 A1 | * | 8/2003 | Wookey et al. ............ 709/217 |
| 2005/0010766 A1 | * | 1/2005 | Holden et al. ............ 713/166 |

OTHER PUBLICATIONS

Enterprise Systems Architecture/390—Common I/O—Device Commands.
Enterprise Systems Architecture/390 System/360 and System/370 I/O Interface Channel to Control Unit Original Equipment Manufactures' Information.
Das Druckerbush—Technik und Technologlen der OPS—Hochleistungsdrucker, Drucktechnologien Ausgabe 4a, Mai 1999 ISBN 3–00–001019–X.

* cited by examiner

Primary Examiner—Arthur G. Evans
(74) Attorney, Agent, or Firm—Schiff Hardin LLP

(57) ABSTRACT

In a method and system for transmitting print data in blocks from a transmission unit to a reception unit via a data line by means of channel command words (CCWs), a channel initialization command (unit) is transmitted from the reception unit to the transmission unit for starting the data transmission of a first data block and the data block is transmitted from the transmission unit to the reception unit. The reception unit forwards the received data blocks to a check unit for checking the data integrity (parsing) and promptly sends a transmission confirmation message (Sim Term) to the transmission unit before or during the checking process (parsing), so that a second data block can be transmitted from the transmission unit into an intermediate memory of the reception unit during the checking process (parsing) of the first data block. An increase in speed in the data transfer channel (particularly S/370, ESCON and SCSI) thus is obtained between a host computer or spooler to the controller of a printing device in that the control of the transmission of Channel Command Words (CCWs) is increased by a parallelizaton of the process.

11 Claims, 4 Drawing Sheets

METHOD, DEVICE AND COMPUTER PROGRAM ELEMENT FOR TRANSMITTING PRINT DATA

BACKGROUND OF THE INVENTION

The invention relates to a method, a device system and a computer program element for transmitting print data. It particularly relates to high-performance print systems, wherein print data, with speeds of more than 40 pages up to a few thousand pages per minute, are transmitted by a host computer or spooler to a print device.

For example, such a print system is described in the publication "Das Druckerbuch, Dr. Gerd Goldmann (publisher), Oce Printing Systems GmbH, publication 4a, Poing (May 1994), ISBN 3-00-00 1019-X" in chapter 10, particularly under the headline "Blockschaltung Hardware" with the title "SRA Controller", pages 10-4 through 10-5.

Efficient connecting lines (channels) supporting a command structure are used in such systems for transmitting data. For example, such channels are the system/360 or the system/370, which have been specified by the company International Business Machines Corporation (IBM). These channels are described in greater detail in the IBM publications "Enterprise System Architecture/390, System/360 and System 370/I-O Interface Channel to Control Unit, No. GA-22-6974-10, 11. Publication, September 1992" and "Enterprise Systems Architecture/390, Common I-O Device,No. SA-7204-01, $2^{nd}$ publication, April 1992".

The print data themselves can be transmitted in different print languages such as AFP (Advanced Function Presentation), PCL (Printer Command Language) or IPDS (Intelligent Printer Data Stream).

The what is referred to as ESCON interface, which is described in the IBM publication No. FA 22-7202 with the title "IBM Enterprise Systems Architecture/390 ESCON I/O Interface", also supports such a command structure.

The aforementioned publications are incorporated into the present specification by reference.

A basic property of such command structures is that the data stream transmitted by the channel or the data interface is divided into channel command words—what are referred to as CCW's (Channel Command Words). It is differentiated between different command types, for example what are referred to as control commands carrying out specific device control functions such as the positioning of a hard disk mechanism in a fixed-disk storage. What is referred to as a read-command starts a transmission of data from the reception unit to the transmission unit. For example, the status of the printer controller can be transmitted to the host computer by a read-command word when data are transmitted from a host computer to a controller of a printer. The connection of the data interface to a printer controller also is called a channel-specific interface (CSI).

Another basic property of the cited interfaces is that a specific unit, in a data transmission system, always is fixed as the what is referred to as transmitter (referred to as channel in many cases) and that the unit connected to the transmission unit is fixed as a reception unit (referred to as an I-O device in many cases). For example, in a printing system wherein a print device is connected to a host computer or to a spooling unit, the host computer or spooler normally is the transmission unit (channel), whereas the print device contains the reception unit (I/O-device). This classification is explained in that the print data are transmitted regularly from the host computer to the print system, i.e., the data flow predominately occurs from the host computer to the print device, whereas only a few bits of status information are to be transmitted from the print device to the host computer.

In the communication between a host computer and a print device, the write-CCW's therefore represent the dominating quantity regarding channel command words, since the print data are transmitted by these commands.

The data line between the host computer and the print device increasingly represents a bottleneck with respect to the print performance.

SUMMARY OF THE INVENTION

Therefore, an object of the invention is to obtain a high data transmission rate between a transmission reception unit and a reception unit, which carry out the transmission of data on the basis of channel command words.

According to the method and system of the invention for transmitting print data in blocks from a transmission unit to a reception unit via a data line by means of channel command words, with the reception unit transmitting a channel initialization command to the transmission unit for starting the data transmission of a first data block. With the transmission unit transmitting the first data block to the reception unit. With the reception unit forwarding the received first data block to a check unit for checking the data integrity such as by parsing or other technique. With the reception unit transmitting a transmission confirmation message to the transmission unit prior or during the checking process. With the transmission unit transmitting a second data block into an intermediate memory of the reception unit during the checking process of the first data block.

A transmission unit transmits, according to the invention, print data to a reception unit via a data line by channel command words, what are referred to as CCW's. The invention makes it possible to use known lines, hardware components and/or protocols and thus to considerably increase the data throughput vis-a-vis the known systems.

A channel initiation command is transmitted according to the invention from the reception unit to the transmission unit for starting the data transmission of a first data block, the data block then is transmitted from the transmission unit to the reception unit, and the received data blocks are forwarded from the reception unit, for checking the data integrity in what is referred to as a parsing process, to a check unit. The reception unit sends a transmission-confirmation message, already before or during the checking process, to the transmission unit, so that the transmission unit can transmit a second data block into an intermediate memory of the reception unit already during the checking process of the first data block.

The inventive method or, respectively, the corresponding interface structure—wherein an intermediate memory is provided in the reception unit, particularly a channel—specific interface, whereby the following data block can be buffered in the intermediate memory as long as the checking process of the previous data block has not yet been completed—makes is possible to significantly increase the data throughput between the transmission unit and reception unit by maintaining given specifications of known channels such as S/370, ESCOM or SCSI.

The invention is based on knowledge that a significant increase regarding the transmission rate (performance) can be achieved for the aforementioned systems when the most frequently occurring write channel command words are transmitted from the transmitter (host) to the receiver (printer) with as little interruption as possible. Furthermore, it has been recognized that a transmission with as little interruption as possible can be obtained when a confirmation message (termination)—which is not output according to the prior art before the checking process has been completed— is simulated already before the data checking process (parsing) has been completed and is announced with the simulation message to the transmission unit. As a result thereof, the next write-CCW can be transmitted already during the parsing process of the previously received data block and therefore an overall higher data throughput can be obtained than can be obtained with known systems.

The applicant has measured that the data transfer rate between a host computer and a printer controller increased from 7.4 MB/second (measured at a system according to the prior art) to 11.5 MB/second as a result of the inventive method.

In a preferred exemplary embodiment of the invention, the reception unit monitors the checking process and a confirmation message is output to the interface of the reception unit after the data integrity has been determined, where the confirmation message is forwarded from the reception interface to the interface of the transmission unit.

In the reverse case—when the reception unit determines that the data integrity is not given—an error message preferably is output to the interface of the reception unit and also is forwarded to the transmission interface. Subsequently, the transmission unit preferably transmits the corresponding data block again, which previously has not been transmitted with fall integrity, to the reception unit. As a result of such a what is referred to as recovery process, all print data of a printing order can be correctly transmitted to the printer or to the ultimate recording medium.

Further exemplary embodiments of the invention are subsequently explained in greater detail on the basis of the drawing Figures.

DESCRIPTION OF THE PREFERRED EMBODIMENTS

Figure 1:
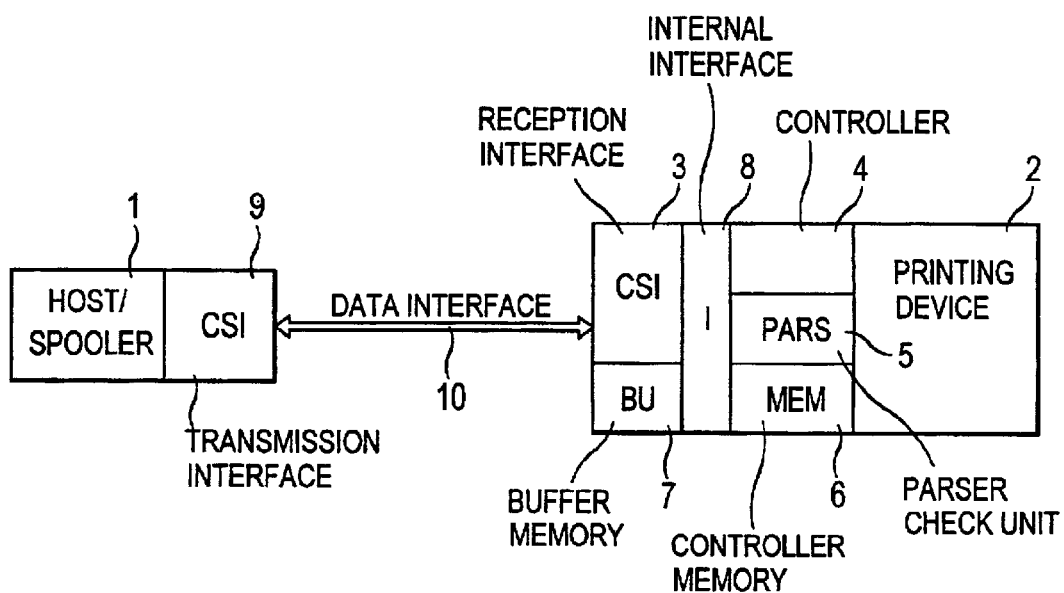
FIG. 1 shows a printing system of the invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to ne skilled in the art to which the invention relates.

Figure 3A:
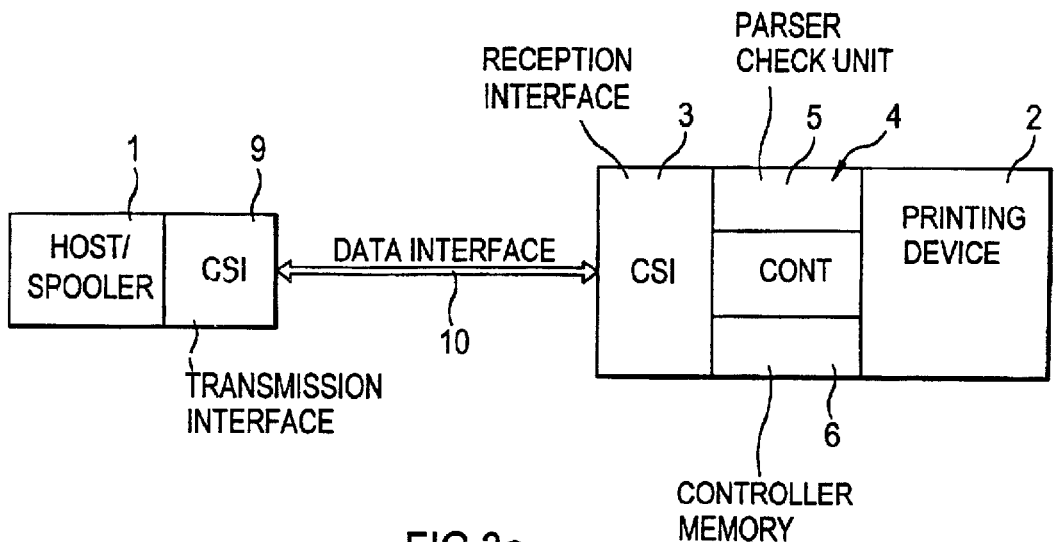
FIG. 3 shows the method and system according to the prior art.

FIG. 3a shows the basic components of a typical, currently known high-performance system. A host computer 1 contains a transmission interface 9 (channel-specific interface CSI) via which it is to be connected to a printing device 2 by a connecting line 10 and a corresponding reception interface 3 of a controller 4. The connecting line 10 is a S/370 line, an ESCON channel or a SCSI channel. Data arriving in the controller 4 via the connecting line 10 and the reception interface 3 are deposited there in an electronic memory 6. The controller 4 also has a checking unit 5 with which incoming data can be checked concerning their integrity. The controller 4 comprises electronic components (hardware, firmware) and/or can contain computer program elements (software, module), which cooperate with corresponding hardware modules such as a microprocessor, a memory (ROM PROM, EPROM), etc.

Figure 2:
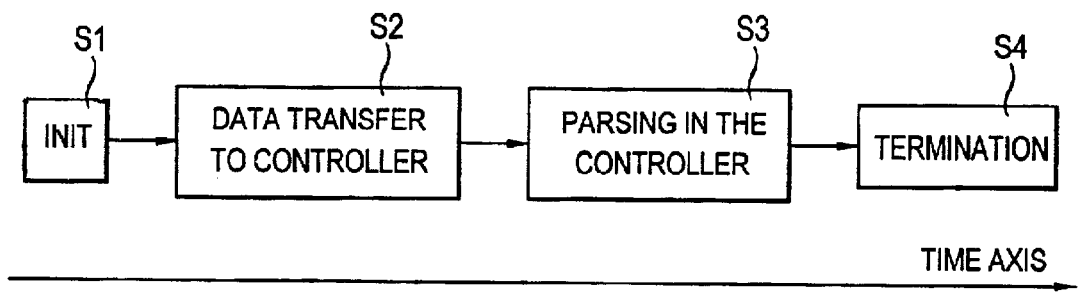
FIG. 2 shows the chronological process of a data transmission with write-channel command words.

FIG. 2 initially shows the basic chronological process which is fixed when a data block is transmitted within a print data stream by a write-channel command word (write CCW).

In a step S1, a new write-channel command (write CCWs) is generated in a host computer or in a print data spooler. An initialization sequence containing the type of the command (read/write) is formed for this purpose. This initialization sequence is transmitted to the receiver of the data, e.g. to a printer and is recognized by it. The printer possibly can reject or deny the processing of the CCW, e.g. when it is not ready to print at the time of reception.

In step S2, i.e. after the write CCWs have been successfully initialized, not only print data but also control data are transmitted from the host computer to the controller of the printing device and are secured in its memory.

As soon as the data are available in the controller of the printing device, they are checked with respect to logical data errors, i.e. with respect to their integrity concerning prescribed integrity rules. In step S4, the controller of the printing device answers the result of what is referred to as a parsing process back to the host computer and referred to as a termination sequence.

Figure 3B:
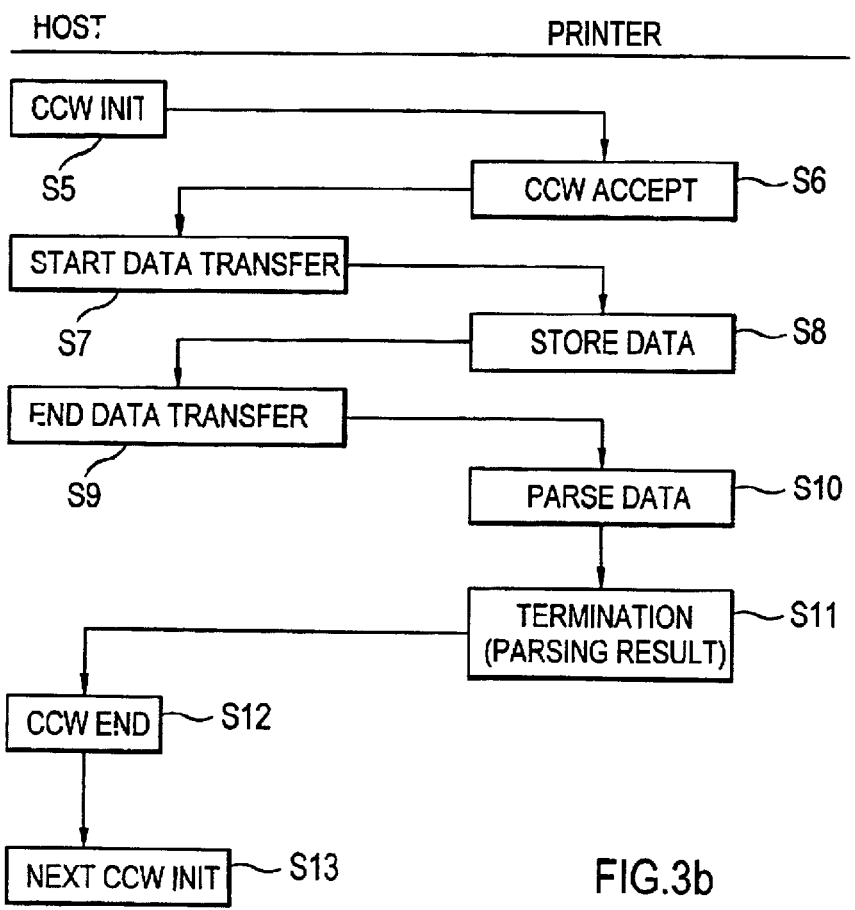

FIG. 3b shows the process, which is schematically shown in FIG. 2, in greater detail and shows it divided into processes occurring within the host computer (steps S5, S7, S9, S12 and S13) and processes occurring on the part of the printing device (steps S6, S8, S10 and S11). In step S5, the host computer 1 generates the initiation command and is transmitted via the channel-specific transmission interface 9, the data line 10 and the reception CSI 3 to the controller 4 of the printing image or format 2. In step S6, the controller 4 accepts the CCW "init" initiated by the host computer 1. After the confirmation channel control word has been received in the host computer, it starts the data transfer in step S7, and the controller 4 of the printing device 1 in step S7 secures the data arriving at it in the main memory 6. After an end information has been received (step S9) by the host computer, the received print data are checked in the checking unit 5 of the controller 4 with respect to their data integrity (step S10). In the host computer 1, the result of the check is communicated from the printer controller 4 in the termination sequence in step S11.

In step S12, the host computer then generates an end control command and a control command for initializing the next data block (step S13).

FIG. 1 shows a system of the invention having a few components more in addition to the components of a print system already shown in FIG. 3a. The reception interface 3 is supplemented by an electronic intermediate memory 7 (buffer memory) in which data received by the data line 10 can be temporarily stored before they are transferred into the memory 6 of the controller 4. Print data that are temporarily stored in this way can be copied from the intermediate memory 3 directly into the memory 6 of the controller 4, for example by a direct memory access (DMA) or, respectively, by an internal interface 8.

Figure 4:
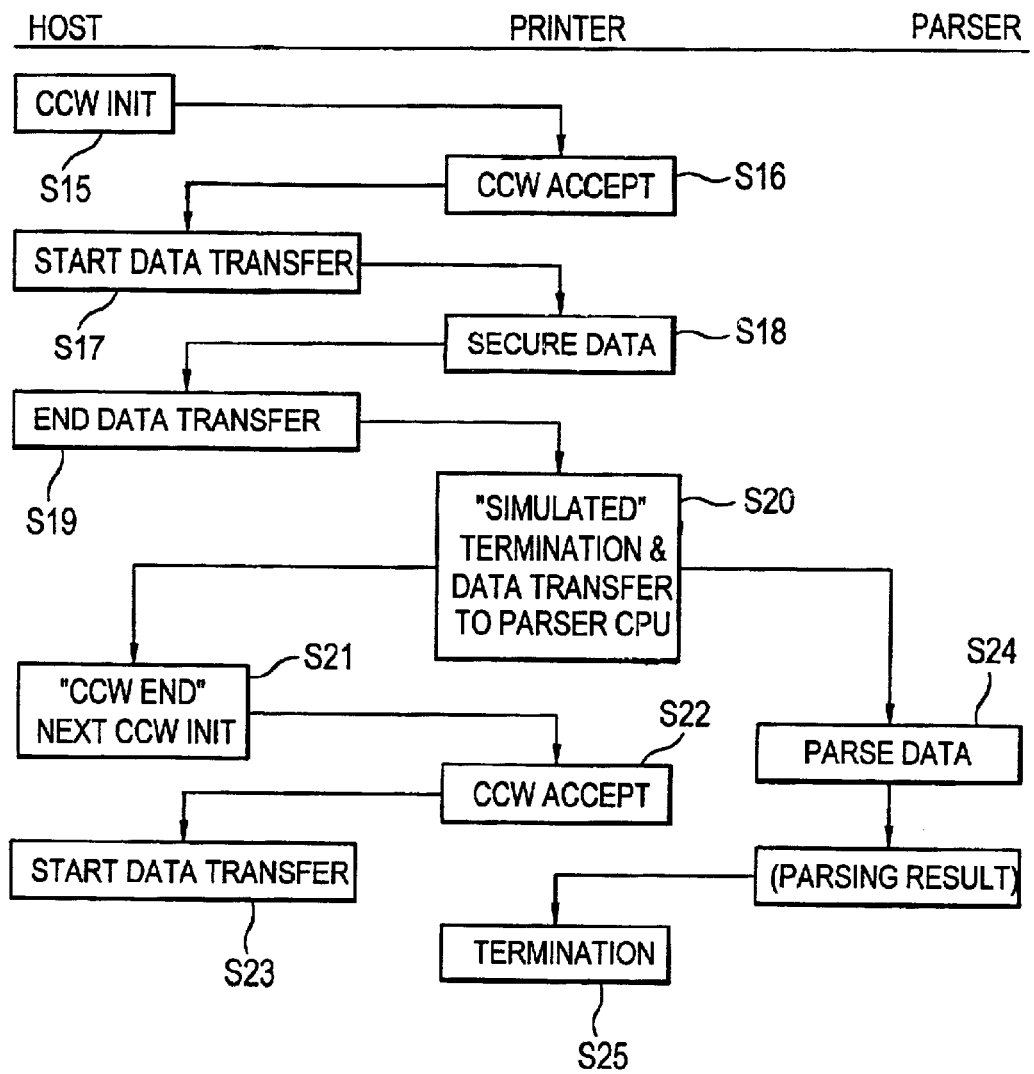
FIG. 4 shows a data transmission process of the invention.

FIG. 4 shows the chronological process of write-channel command words (write CCW's) by means of which the data processing is parallelized within the printer controller 4, so that the data transfer is significantly accelerated vis-a-vis the process shown in FIG. 3*b*. While the data processing steps are identical in this method on the part of the host computer (steps S15, S17, S19, S21 and S23) and since, from the perspective of the host, there is practically no difference regarding the logical method process, the data processing within the printing device, particularly in the interface 3 and in the parser 5, is significantly modified.

In step S15, the host computer 1, in turn, initializes the data transmission process by an initialization command. In step S16, the printer generates a release command CCW Accept and the host computer starts the data transfer in step 17. The printing device stores these data in step S18 until the end of the data transfer (S19). Contrary to the course of action shown in FIG. 3*b*, the input interface 3 of the controller 4, however, generates a simulated, preliminary "good" termination in step S20 for forwarding to the host, so that the host computer 1 assumes that the parsing has already been completed in the controller. This simulated acknowledge message about the end of the checking process now enables the parallel processing of the first received data blocks in step S24, while, on the part of the host computer 1 in step S21, the end command and the initialization command for the next data block is already being generated and sent to the controller. In step S22, the controller can already release the start of the data transfer (S23), while the previously received data are checked in step S24. The data transfer S23 of the following data block then is temporarily stored in the intermediate memory 7 of the reception interface until the check of the first data block (S24) has been completed and a corresponding, final acknowledge message about the parsing result is generated by the parser 5 in step S25 and is answered back to the host computer via the reception interface 3.

If the parser 5 detects an error of the data blocks (lack of data integrity), the host computer 1 is not informed of this error before the following CCW. If the print data stream is an IPDS (Intelligent Printer Data Stream), these errors can be related to pages within the IPDS emulation environment and a recovery process thus can be successfully carried out, i.e., the previously incorrectly transmitted data can be transmitted a second time and can be allocated again according to page within the following data processing and a page-precise printout is possible as a result.

Figure 5:
FIG. 5 shows a data transmission schema according to the prior art.
Figure 6:
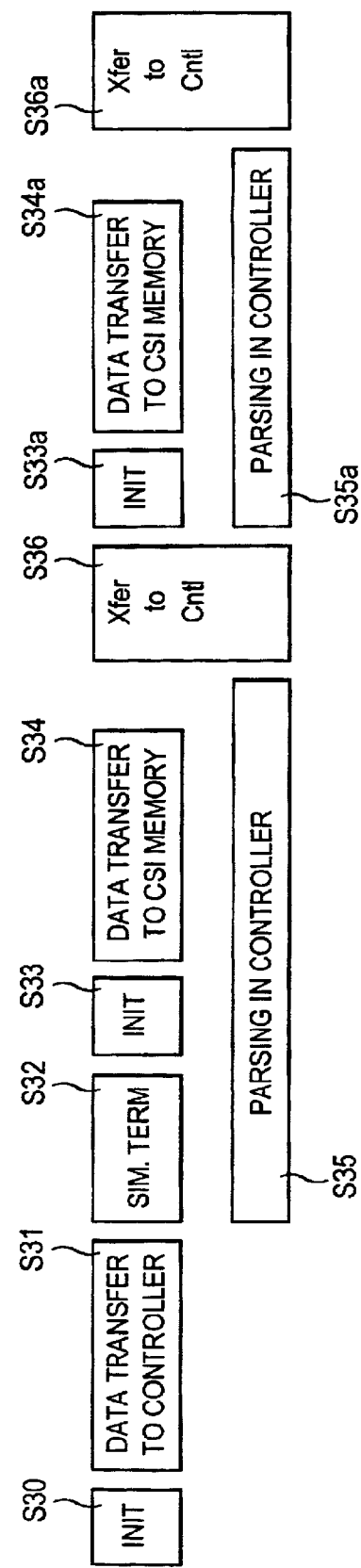
FIG. 6 shows a data transmission scheme of the invention.

Once again, FIG. 6 shows the inventive chronological process of the data transfer and of the data processing in a block diagram, whereby the difference between the known method as shown in FIG. 5 and the invention becomes particularly clear.

Subsequent to the initialization phase S30, the host computer 1 transmits the first data block to the controller 4 of the printing device 2. In step S32, the reception interface 3 of the controller 4 promptly informs the host computer of the parsing process being completed. In contrast to the process as shown in FIG. 2, it no longer waits for the final result of the parsing of the print data but the host computer promptly receives a (preliminary) positive status message (simulated termination).

In step S35, the print data in the controller 4 are actually checked (parsing) in a CPU environment that is separate from the reception interface 3. The print data still can be checked in the controller 4 of the device 2.

At the same time as the check process (S35) in the controller 4, the host computer 1 starts a new data transfer to the reception interface 3, which deposits these following (second) data blocks in an intermediate memory 7. As soon as the check process (S35) is completed in the parsing unit 5, the temporarily stored print data are copied (step S36) from the intermediate memory 7 directly into (per DMA) the memory 6, which is allocated to the parsing unit 5 (step S36). Then the process starts again for the following data packet (steps S33*a*, S34*a*, S35*a* and S36*a*).

Overall, it can be stated once again that the speed is increased in the data transfer between a host computer or spooler to the controller of a printing device in that the control of the transmission is significantly increased in channel structures known per se with CCWs (Command Channel Words) by parallelizaton of the process. This is achieved in that the reception interface (CSI) is expanded within the controller by a DMA-capable memory and a corresponding process control to an active CSI. The completion of the check is simulated in that a preliminary, positive status message about the completion of the parsing process is provided, so that it is possible to transmit the next data packet early.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim as my invention:

1. A method for transmitting print data in blocks from a transmission unit to a reception unit via a data line by means of channel command words, comprising the steps of:

with the reception unit transmitting a channel initialization command to the transmission unit for starting the data transmission of a first data block;

with the transmission unit transmitting the first data block to the reception unit;

with the reception unit forwarding the received first data block to a check unit for checking data integrity by parsing;

with the reception unit transmitting a transmission confirmation message to the transmission unit prior or during the parsing checking process; and with the transmission unit transmitting a second data block into an intermediate memory of the reception unit during the parsing checking process of the first data block.

2. The method according to claim 1 wherein the confirmation message is generated as a channel command word by an active interface of the reception unit and transmitting the message to an interface of the transmission unit.

3. The method according to claim 1 wherein the checking parsing process is monitored by the reception unit and a termination message is output to the interface of the reception unit after the data integrity has been determined.

4. The method according to claim 3 wherein the message is forwarded from the reception interface to the transmission interface.

5. The method according to claim 1 wherein after the data integrity checking of the first data block has been completed the second data block is deposited into a memory of the check unit for checking the data integrity.

6. The method according to claim 1 wherein the reception unit monitors the integrity check by parsing and an error message is output to the interface of the reception unit when it is detected that the data integrity is not given.

7. The method according to claim 6 wherein the error message is forwarded from the reception interface to the transmission interface and the transmission unit, and thereafter transmits the corresponding data block again.

8. The method according to claim 1 wherein at least one of an S/370 line, an ESCON line and an SCSI line is used as the data line.

9. A system for transmitting print data in blocks, comprising:
- a transmission unit;
- a reception unit;
- a data line on which channel words are sent;
- the reception unit transmitting a channel and initialization command to the transmission unit for starting the data transmission of a first data block;
- the transmission unit transmitting the first data block to the reception unit;
- the reception unit also forwarding the received first data block to a check unit for checking data integrity by parsing;
- the reception unit also transmitting a transmission confirmation message to the transmission unit prior or during the parsing checking process; and
- the transmission unit also transmitting a second data block into an intermediate memory of the reception unit during the parsing checking process of the first data block.

10. A method for transmitting print data in blocks from a transmission unit to a reception unit via a data line by means of channel command words, comprising the steps of:
- with the reception unit transmitting a channel initialization command to the transmission unit for starting the data transmission of a data block;
- with the transmission unit transmitting the data block to the reception unit;
- with the reception unit forwarding the received data block to a check unit for checking data integrity;
- with the reception unit transmitting a transmission confirmation message to the transmission unit prior or during the data integrity checking process; and
- with the transmission unit transmitting a further data block into an intermediate memory of the reception unit during the data integrity checking process of the original data block.

11. A system for transmitting print data in blocks, comprising:
- a transmission unit;
- a reception unit;
- a data line on which channel words are sent;
- the reception unit transmitting a channel and initialization command to the transmission unit for starting the data transmission of a data block;
- the transmission unit transmitting the data block to the reception unit;
- the reception unit also forwarding the received first data block to a check unit for checking data integrity;
- the reception unit also transmitting a transmission confirmation message to the transmission unit prior or during the data integrity checking process; and
- the transmission unit also transmitting a further data block into an intermediate memory of the reception unit during the data integrity checking of the original data block.

* * * * *